United States Patent
Yamazaki (10) Patent No.: US 8,588,645 B2
(45) Date of Patent: *Nov. 19, 2013

(54) MULTI-FUNCTION PRINTER

(75) Inventor: Ryuya Yamazaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,545

(22) Filed: Aug. 1, 2012

(65) Prior Publication Data

US 2012/0294651 A1 Nov. 22, 2012

Related U.S. Application Data

(63) Continuation of application No. 12/210,418, filed on Sep. 15, 2008, now Pat. No. 8,238,783.

(30) Foreign Application Priority Data

Oct. 2, 2007 (JP) ................................. 2007-258595

(51) Int. Cl.
 *G03G 15/00* (2006.01)
 *G03G 15/08* (2006.01)

(52) U.S. Cl.
 USPC ............................ 399/107; 399/262; 399/367

(58) Field of Classification Search
 USPC ......... 399/107, 110, 119, 124, 262, 367, 405; 358/1.13
 See application file for complete search history.

(56) References Cited

U.S. PATENT DOCUMENTS

| 6,736,392 | B1 | 5/2004 | Horiguchi et al. |
| 7,710,616 | B2 | 5/2010 | Ishizuka |
| 8,238,783 | B2 * | 8/2012 | Yamazaki ..................... 399/107 |
| 2005/0200674 | A1 | 9/2005 | Mae et al. |
| 2006/0187291 | A1 | 8/2006 | Asanuma |
| 2007/0065175 | A1 | 3/2007 | Okashi et al. |
| 2007/0071492 | A1 | 3/2007 | Ito |
| 2008/0068442 | A1 | 3/2008 | Saito et al. |

FOREIGN PATENT DOCUMENTS

| JP | 06-194886 | 7/1994 |
| JP | 11-161135 | 6/1999 |
| JP | 2005-215653 | 8/2005 |

* cited by examiner

*Primary Examiner* — Sandra Brase
(74) *Attorney, Agent, or Firm* — Banner & Witcoff, Ltd.

(57) ABSTRACT

A multi-function printer includes an image forming unit and a scanner unit. The image forming unit includes a body casing, a developing unit having a developing roller extending in a lateral direction, a developer cartridge provided on one side of the axis of the developing roller and detachably attached to the body casing, a discharge tray, a side cover, a support unit for supporting the developer cartridge such that the developer cartridge is detachably attached to a front side of the body casing, a sheet feeding tray detachably attachable to the front side of the body casing, and a discharge unit provided on the front side of the body casing and discharging sheet on which an image is formed to the rear side of the body casing. The scanner unit is provided above the image forming unit having a predetermined space opened on the one side therebetween.

16 Claims, 10 Drawing Sheets

MULTI-FUNCTION PRINTER

CROSS-REFERENCE TO RELATED APPLICATIONS

This application is a continuation of prior U.S. application Ser. No. 12/210,418, filed Sep. 15, 2008, which claims priority from Japanese Patent Application No. 2007-258595 filed on Oct. 2, 2007, the entire subject matter of which is incorporated herein by reference.

TECHNICAL FIELD

The present invention relates to a multi-function printer including an image forming apparatus and a scanner unit.

BACKGROUND

An image forming apparatus that forms an image electrophotographically includes a developing cartridge which includes developing rollers and a toner cartridge which accommodates toner. The arrangement of these elements influences the size or usability of the image forming apparatus. In a tandem-type color image forming apparatus, developing cartridges or toner cartridges are arranged in parallel. A layout of these cartridges is greatly important, since these cartridges occupy a large space and maintenance of consumable elements is frequently performed.

JP-A-06-194886 discloses an image forming apparatus, in which toner cartridges are arranged on one end side of developing rollers.

SUMMARY

Aspects of the invention provide a multi-function printer, which includes an image forming apparatus and a scanner unit, capable of improving operability in exchanging consumable elements such as a developer cartridge.

BRIEF DESCRIPTION OF THE DRAWINGS

FIGS. 6A and 6B are perspective views of a multi-function printer according to a second example, in which

FIGS. 7A and 7B are perspective views showing a multi-function printer according to a third example, in which

DETAILED DESCRIPTION

General Overview

According to an aspect of the invention, there is provided a multi-function printer comprising: an image forming unit, comprising: a body casing; a developing unit comprising a developing roller, an axis of the developing roller extending in a lateral direction; a developer cartridge that is provided on one side of the axis of the developing roller and is attachable to or detachable from the body casing; a discharge tray provided on an upper surface of the body casing; a side cover that is provided on the body casing on the one side and is openable and closable; a support unit that is configured to support the developer cartridge in the body casing such that the developer cartridge is attached to or detached from a front side of the body casing when the side cover is opened; a sheet feeding tray that is attachable to or detachable from the front side of the body casing; and a discharge unit that is provided on the front side of the body casing and is configured to discharge sheet on which an image is formed to the rear side of the body casing; and a scanner unit that is provided above the image forming unit having a predetermined space therebetween, the predetermined space being opened on the one side.

Exemplary Embodiments

Exemplary embodiments of the invention will be described with reference to the drawings.

The above described related art image forming apparatus has some disadvantages. For example, in the image forming apparatus disclosed in JP-A-06-194886, the toner cartridges are detached or attached by lifting them upward with respect to an apparatus body. Accordingly, there occurs a problem in that the detaching or attaching operation in front of the image forming apparatus is difficult. Moreover, when it is intended to configure a multi-function printer in which a scanner unit is provided above the image forming apparatus, there occurs a problem in that the detaching or attaching of the toner cartridges is difficult because the scanner unit becomes a hinder.

Aspects of the invention provide a multi-function printer, which includes an image forming apparatus and a scanner unit, capable of improving operability in exchanging consumable elements such as a developer cartridge.

First Example

(1) Multi-Function Printer

Figure 1:
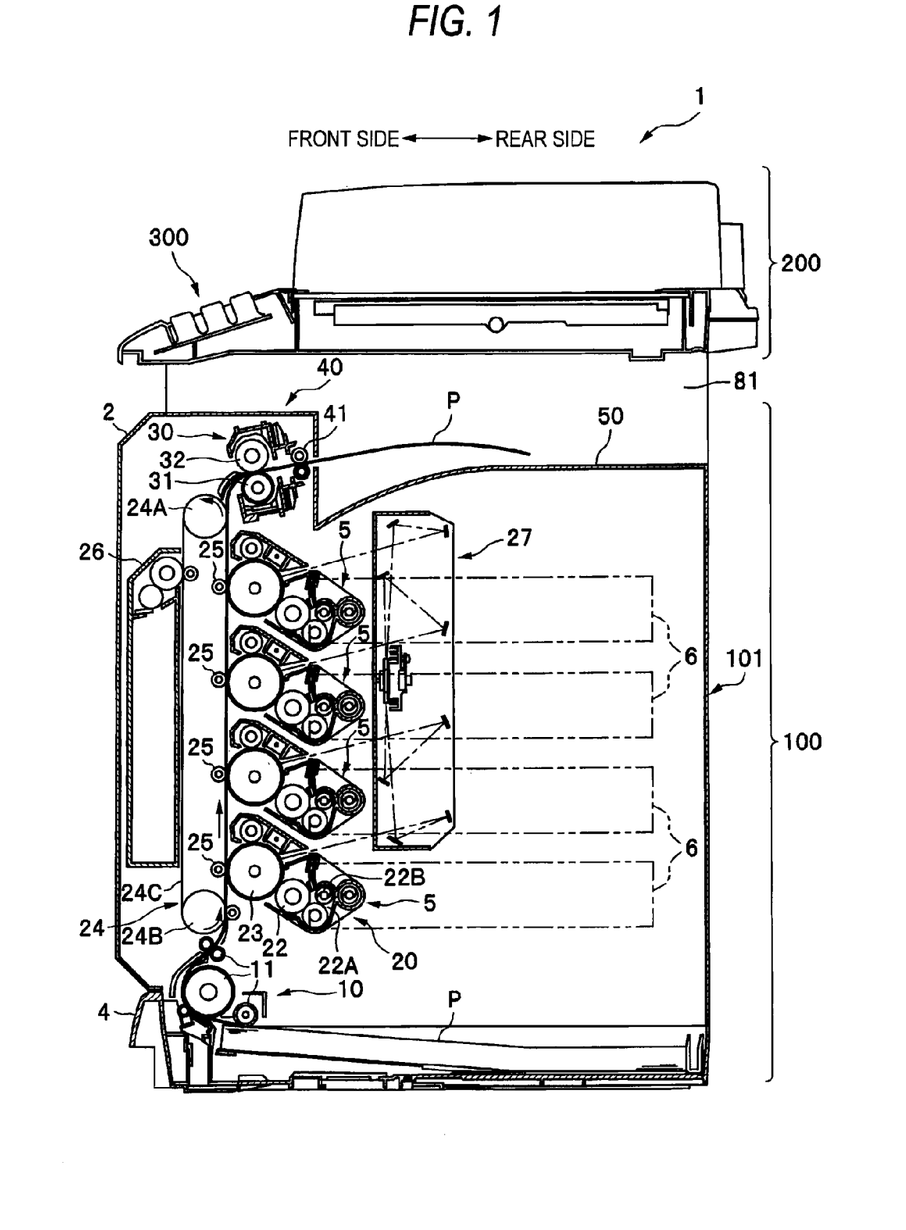
FIG. 1 is a side sectional view showing a multi-function printer according to an exemplary embodiment of the invention.
Figure 2:
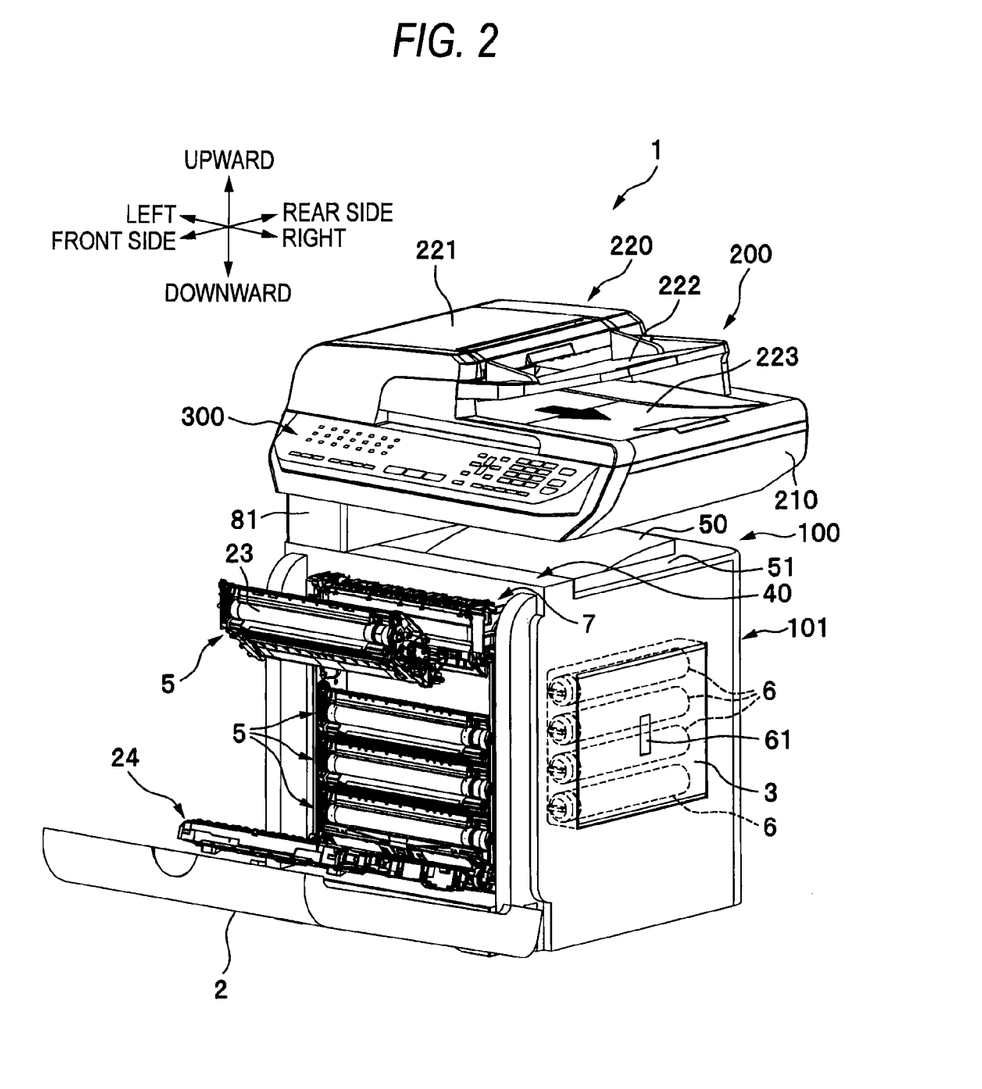
FIG. 2 is a perspective view of the multi-function printer showing a state where a front cover of the multi-function printer is opened.

As shown in FIG. 1, a multi-function printer 1 includes an image forming unit 100, a scanner unit 200 provided above the image forming unit 100, and an operational unit 300 provided in the vicinity of the scanner unit 200. The multi-function printer 1 may have a facsimile function, a scanner function, a printer function, and a copy function. Incidentally, although exemplary embodiments of the present inventive concept will be described in relation to a color laser multi-function printer, the present inventive concept is not limited thereto. As shown in FIG. 2, the scanner unit 200 and the operational unit 300 are supported to the image forming unit 100 through a left-side support member 81 extending in front and rear directions on the left side of the multi-function printer 1. A space between the image forming unit 100 and the scanner unit 200 is opened on one side, which is specifically the right side. Moreover, the space between the image forming unit 100 and the scanner unit 200 is opened on the front side and the rear side as well.

In the following description, a side on which the operational unit 300 can be operated denotes a front surface and a side opposite to the front surface denotes a rear surface. In addition, with reference to a user who performs operations, upward, downward, right, and left sides are shown in FIG. 2. The direction of the front and rear sides may also be referred to as front and rear sides.

(2) Image Forming Unit

As shown in FIG. 1, the image forming unit 100 includes a feeder unit 10, developing units 20, a fixing unit 30, and a discharge unit 40. They are disposed inside a body casing 101.

(2-1) Feeder Unit

The feeder unit 10 feeds sheet P as an example of a printing sheet to the developing units 20 one at a time. The feeder unit 10 includes a sheet feeding tray 4 and sheet feeding rollers 11, which are a sheet conveying mechanism.

The sheet feeding tray 4 is disposed below the body casing 101 and can be extracted from the front side to be detached or attached. The sheets P are stored in the sheet feeding tray 4.

The plural sheet feeding rollers 11 which are provided on the front side of the sheet feeding tray 4 convey the sheets P stored in the sheet feeding tray 4 to the developing units 20 one at a time.

In this example, one sheet feeding tray 4 is provided. Alternatively, plural sheet feeding trays may be provided. If the plural sheet feeding trays 4 are provided, all the sheet feeding trays 4 are extracted from the front side to be detached or attached.

(2-2) Developing Unit

The developing units 20 include developing cartridges 5, developer cartridges 6, conveying belts 24, transfer rollers 25, a developer waste box 26, and a scanner 27.

Each of the developing cartridges 5 includes a developing roller 22 and a photosensitive drum 23. An electrostatic latent image is formed by scanning laser beams by the scanner 27 described below, developer is supplied from the developing roller 22 in a manner in which the photosensitive drum 23 comes in contact with the developing roller 22 while they rotate one another, and a developer image is formed.

According to this example, four developing cartridges 5 are provided with the multi-function printer 1. The four developing cartridges 5 are arranged in parallel in a vertical direction. That is, the multi-function printer 1 is a tandem-type color image forming apparatus. The longitudinal direction of the developing cartridge 5, that is, an axial direction of the developing roller 22 or the photosensitive drum 23 faces the lateral side of the front surface of the multi-function printer 1.

A mounting unit 7 for mounting the developing cartridge 5 in right and left side frames (not shown) is provided with the image forming apparatus body. In addition, a front cover 2 which is opened and closed to expose the mounting unit 7 is provided on the front surface of the body casing 101. The front cover 2 is configured so as to be pivotable on the lower side to be opened and closed. As shown in FIG. 2, when the front cover 2 is opened, the developing cartridge 5 can be detached from the front side.

Figure 3:
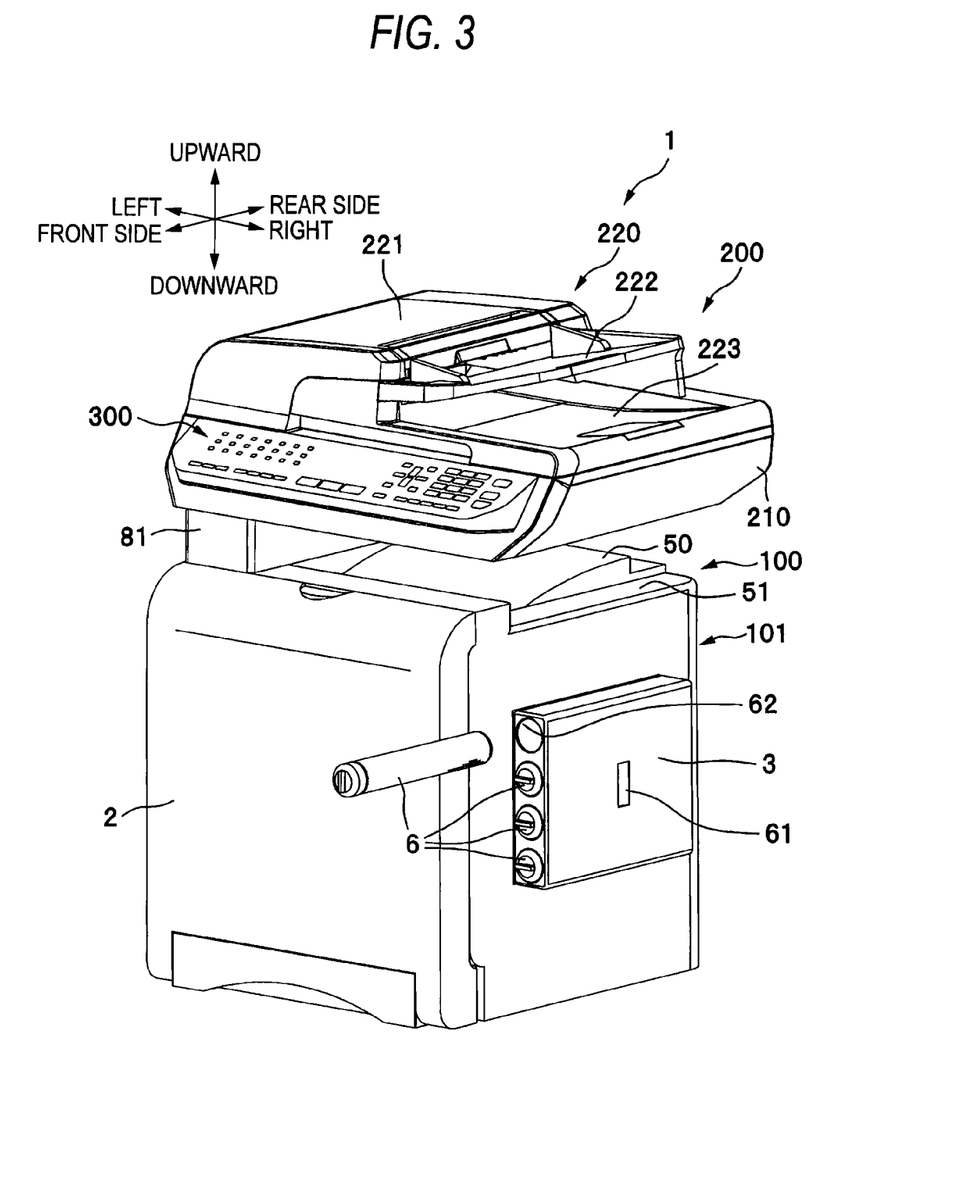
FIG. 3 is a perspective view of the multi-function printer showing a state where a side cover of the multi-function printer is opened.

The developer cartridge 6 is a cartridge type case which receives developer (not shown) therein, which is an example of developer. As shown in FIG. 3, the developer cartridges 6 each have a cylindrical shape and are disposed on one side in an axial direction of the developing roller 22, specifically, on the right side. As described below, it is easy to detach or mount the developer cartridges 6 on the front side.

Figure 4:
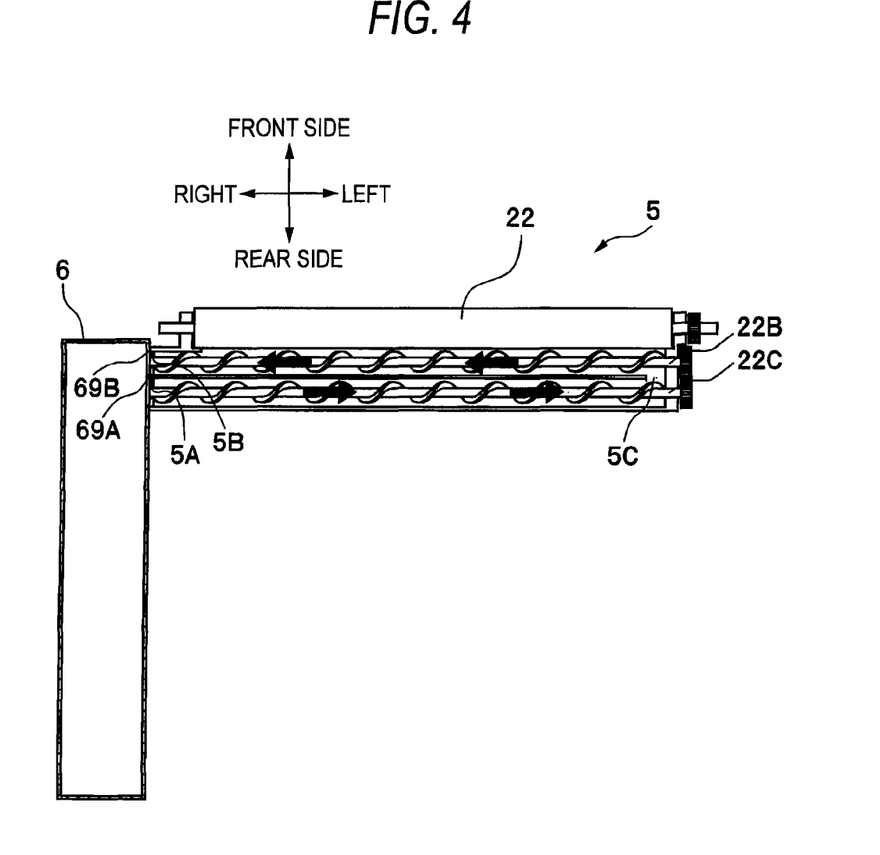
FIG. 4 is a planar sectional view showing a configuration of a developer cartridge and a developing cartridge.

With reference to FIG. 4, circulation of the developer between the developer cartridges 6 and the developing cartridges 5 will be described. In FIG. 4, for convenient explanation, other members between the developer cartridges 6 and the developing cartridges 5 are omitted, and the developer cartridges 6 and the developing cartridges 5 are illustrated in an adjacent manner.

As shown in FIG. 4, a supply port 69A of the developer cartridge for supplying the developer to the developing cartridge 5 and a recovery port 69B of the developer cartridge for recovering the developer from the developing cartridge 5 are formed in each of the developer cartridges 6. A supply port 5A of the developing cartridge and a recovery port 5B of the developing cartridge, which correspond to the supply port 69A of the developer cartridge and the recovery port 69B of the developer cartridge, respectively, are formed in each of the developing cartridges 5. A supply auger 22C and a recovery auger 22B, which correspond to the supply port 5A of the developing cartridge and the recovery port 5B of the developing cartridge, respectively, are formed in each of the developing cartridges 5.

The supply auger 22C is rotatably driven so as to move the developer supplied from the supply port 5A of the developing cartridge toward the left side (the other side). On the other side of the developing cartridge 5, there is formed communication port 5C which communicates with a portion where the supply auger 22C is disposed and a portion where the recovery auger 22B is disposed. In addition, the recovery auger 22B is rotatably driven so as to move the developer, which is moved from the communication port 5C to the recovery auger 22B, to the recovery port 5B (one side) of the developing cartridge.

The developer cartridges 6 and the developing cartridges 5 corresponding to respective colors are disposed so that projections thereof overlap with each other when they are projected in a horizontal direction. Accordingly, since the developer is supplied from the developer cartridge 6 to the developing cartridge 5 with the gravity, the developer can be reliably supplied. Likewise, the developer can be reliably recovered from the developing cartridge 5 to the developer cartridge 6.

The supply port 69A of the developer cartridge and the supply port 5A of the developing cartridge corresponding to each other are located at the same height. In other words, the supply port 69A of the developer cartridge and the supply port 5A of the developer cartridge are disposed so as to overlap with each other, when they are projected in the horizontal direction. Accordingly, since the developer is supplied from the developer cartridge 6 to the developing cartridge 5 with the gravity, the developer can be reliably supplied Likewise, the recovery port 69B of the developer cartridge and the recovery port 5B of the developing cartridge corresponding to each other are located at the same height. In other words, the recovery port 69B of the developer cartridge and the recovery port 5B of the developing cartridge are disposed so as to overlap with each other, when they are projected in the horizontal direction. Accordingly, since the developer is recovered from the developing cartridge 5 to the developer cartridge 6 with the gravity, the developer can be reliably recovered.

In this way, the developer can be smoothly circulated between the developer cartridge 6 and the developing cartridge 5, since the developer cartridge 6 and the developing cartridge 5 corresponding to each other are disposed so as to overlap with each other when they are projected in the horizontal direction and since the supply port 69A of the developer cartridge and the supply port 5A of the developing cartridge corresponding to each other are located at the same height and the recovery port 69B of the developer cartridge and the recovery port 5B of the developing cartridge corresponding to each other are located at the same height. Accordingly, when non-magnetic one component developer is particularly used, degradation of the developer can be suppressed, thereby improving image quality.

As shown in FIG. 1, the conveying belt 24 is provided so as to be adjacent to the front surface of the four developing cartridges 5. The conveying belt 24 includes a driving roller 24A disposed on the upper side, a driven roller 24B disposed on the lower side, and a belt 24C suspended on the driving roller 24A and the driven roller 24B. The conveying belt 24 is driven so that its side facing the developing cartridges 5 is moved from a downward side to an upward side to convey the sheets P supplied from the feeder unit 10 from the downward side to the upward side in a direction in which the photosensitive drums 23 of the developing cartridges 5 are arranged. As shown in FIG. 2, the conveying belt 24 is fixed on the front cover 2 by screws or the like. With such a configuration, by opening the front cover 2, the developing unit 20 is partitioned at a boundary formed by a passage along which the sheets P are conveyed, and sheet-jam handling or the like can be easily performed from the front side when the sheets P are jammed.

Each of the transfer rollers 25 is disposed so as to face each of the photosensitive drum 23 with the belt 24C interposed therebetween. The transfer rollers 25 each transfer a developer image on the photosensitive drum 23 to the sheet P by applying a transfer bias.

The developer waste box 26, which is disposed in the front of the conveying belt 24, is a box which recovers the developer transferred on the belt 24C, which is a test pattern for color change detection.

The scanner 27, which includes four laser devices (not shown), various lenses, and various reflecting minors, faces the photosensitive drums 23 of the developing cartridges 5 to scan laser beams in the right and left directions. The laser devices light on and off by a control unit (not shown) in accordance with data of an image to be formed.

(2-3) Fixing Unit

The fixing unit 30 includes a heating roller 31 and a pressuring roller 32. The heating roller 31 and the pressuring roller 32 heat the sheet P with the sheet P inserted therebetween to fix developer on the sheet P.

(2-4) Discharge Unit

The discharge unit 40, which is provided on the front side of the body casing 101, includes sheet discharge rollers 41. The sheet discharge rollers 41 are disposed in the rear of the fixing unit 30 and convey the sheet P subjected to the fixing process of the fixing port 30 from the front side to the rear side with the sheet P interposed therebetween.

A discharge tray 50 is formed on the upper surface of the image forming unit 100. The sheets P subjected to the image forming process are discharged from the front side by the sheet discharge rollers 41 to be stacked on the discharge tray 50. The discharge tray 50 is formed as an inclined surface which gradually gets higher from the front side to the rear side.

As shown in FIG. 2, a side cover 3 is provided on the right side of the body casing 101. A handle 61 is formed on the side cover 3. The side cover 3 having a box-like shape is formed so as to be displaced, specifically, to be slid with respect to the body casing 101 in the horizontal direction. Accordingly, as shown in FIG. 3, the side cover 3 is movable horizontally in the right direction to be opened by pulling the handle 61 by a user.

Mounting holes 62 as an example of a support unit for supporting the developer cartridges 6 are formed in the side cover 3. The mounting holes 62 are each formed as a hole having a circular sectional surface corresponding to the outer shape of the developer cartridge 6 and are opened on the front side so that the axial direction thereof is oriented in the front and rear directions. With such a configuration, a user can detach or mount the developer cartridge 6 on the front side in the state where the side cover 3 is opened.

As shown in FIG. 2, the right portion of the discharge tray 50, more specifically, the right portion higher than the rear portion of the discharge tray 50 is opened. In addition, at least a part of the discharge tray 50, that is, a stepped portion 51 lower than the high portion on the rear side in FIG. 2 is formed on the right upper end of the body casing 101.

On the front side, a sheet discharge guide which prevents the sheets P filed in the discharge tray 50 from falling down is configured in the discharge unit 40 which is formed higher than the discharge tray 50. In addition, on the left side (the other side) opposite to the right side, the left support member 81 adjacent to the discharge tray 50 is also configured as a discharge guide.

Since the stepped portion 51 is formed lower than a part of the discharge tray 50, the discharge tray 50 is opened on the right side. A user can easily take the sheets P subjected to the image forming process on the front of the multi-function printer 1 by stretching the hand toward the right side of the apparatus.

(3) Scanner Unit

As shown in FIG. 2, the scanner unit 200 includes a flat bed 210 and an automatic document feeder (ADF) 220 provided above the flat bet 210. The automatic document feeder 220 includes a reading section 221 (not shown), a document supply tray 222, and a document discharge tray 223.

The reading section 221 is disposed on the left side of the scanner unit 200 and the document supply tray 222 extends from the reading section 221 toward the right side. That is, the document supply tray 222 is relatively opened on the right side.

The document discharge tray 223 is disposed on the right side of the reading section 221 and below the document supply tray 222.

The automatic document feeder 220 discharges reading documents put in the document supply tray 222 to the document discharge tray 223. A discharge direction is oriented from the left side to the right side, as indicated by an arrow shown in FIG. 2.

Figure 5:
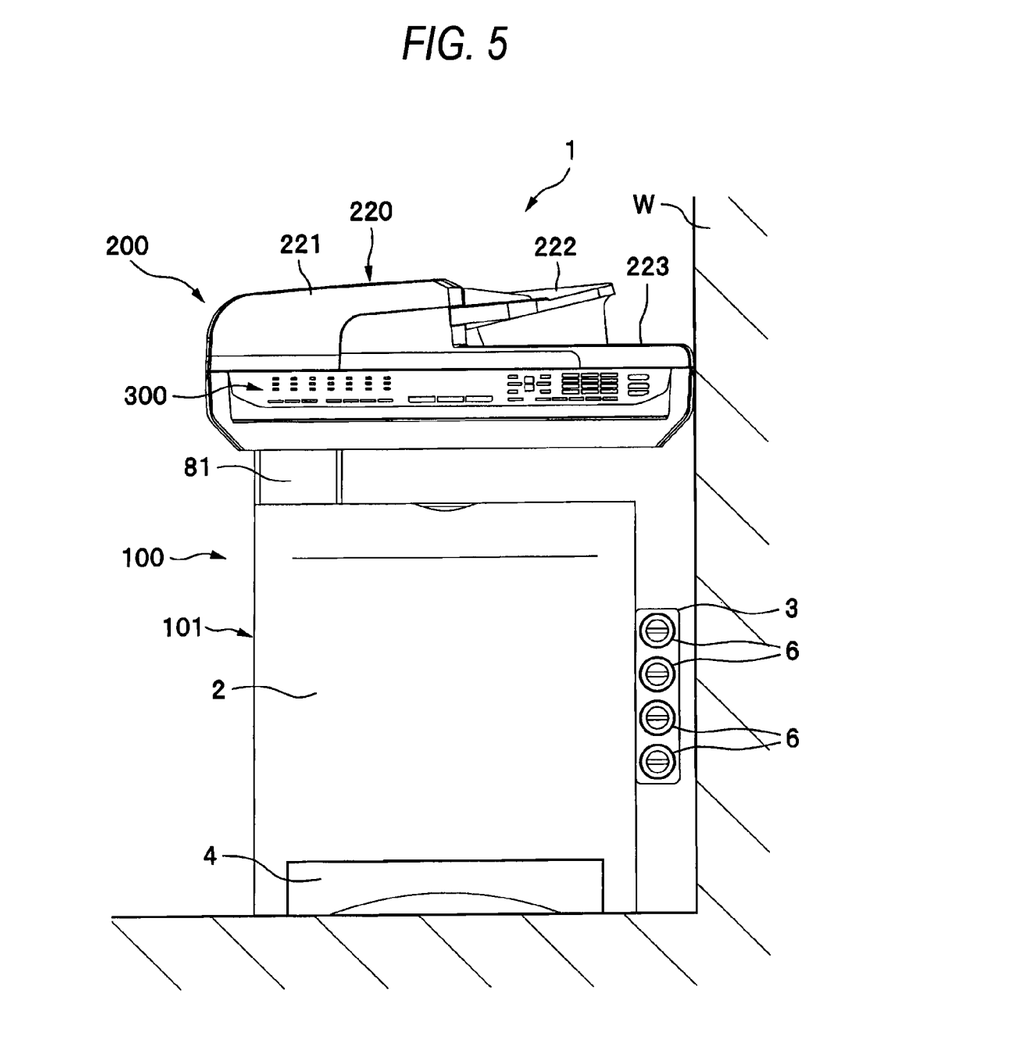
FIG. 5 is a front view of the multi-function printer showing a state where the multi-function printer is installed so that a right side thereof is against a wall and the side cover is opened.

The right end portion of the scanner unit 200 protrudes more than the side cover 3 in the right direction in the state where the side cover 3 is closed. More specifically, as shown in FIG. 5, the right end portion of the scanner unit 200 protrudes more than the side cover 3, even when the side cover 3 is opened so as to extract the developer cartridges 6.

When the multi-function printer 1 is used as a printer, the sheet P is fed to the sheet feeding tray 4, passed along the conveying passage on the front side within the body casing 101, conveyed while an image is being formed, and discharged to the discharge tray 50. In this case, an operation of feeding the sheet P in front of the apparatus is easy, since the sheet feeding tray 4 can be extracted from the front side to be detached or attached.

In exchange of the developer cartridge 6, the developer cartridge 6 is extracted from the front side to be detached or attached, after the right side cover 3 of the body casing 101 is displaced, specifically, pulled out in the horizontal direction. Accordingly, it is easy for a user to exchange the developer cartridge 6 in front of the apparatus. Moreover, since a support unit is provided with the side cover 3, the developer cartridge 6 can be detached or attached just by opening the side cover 3. Accordingly, operability can be improved. Moreover, as shown in FIG. 5, the scanner unit 200 protrudes in the right direction more than the side cover 3. Accordingly, even though the multi-function printer 1 is installed against a right wall W, the exchanging of the developer cartridge 6 in front of the apparatus is easy. In addition, the developer cartridge 6 is detached or attached in front and rear of the apparatus after the developer cartridge 6 is extracted from the right side of the body casing 101. Accordingly, since it is not necessary to provide an additional space for detaching and attaching the developer cartridge 6, it is possible to reduce the size of the apparatus, compared to the configuration where the developer cartridge 6 is detached or attached on the front side.

When the sheet P is jammed during the image forming process, the conveying passage of the sheet P is exposed just by opening the front cover 2. Accordingly, it is easy to perform a jam handling process of the sheet P. Moreover, the discharge unit 40 is provided on the front side of the body casing 101. Accordingly, even though the sheet P is jammed in the discharge unit 40, the jam handling process is easily performed as well.

The sheets P subjected to the image forming process are discharged in the discharge tray 50. However, since the space between the image forming unit 100 and the scanner unit 200 is opened on the right side, a user can easily take out the sheet P subjected to the image forming process in front of the multi-function printer 1 by stretching the right hand toward the right side. In this example, it is possible to move the sheets P discharged in the discharge tray 50 rightward a little and easily take out the sheets P, in that the stepped portion 51 formed lower than the discharge tray 50 is provided on the right upper end portion of the body casing 101. In addition, a user can take out the sheets P subjected to the image forming process, seeing the sheets P with the naked eye, since the space between the image forming unit 100 and the scanner unit 200 is opened on the front side.

A user sets documents in the document supply tray 222, when the multi-function printer 1 is used as a scanner or a copy machine. The set documents are read by the reading section 221 to be discharged in the document discharge tray 223 from the left side to the right side. Accordingly, a user can easily take out the documents from the right side.

As described above, the operability can be improved since the operating of the operational unit 300, the detaching and attaching of the developing cartridges 5, and the jam handling of the jammed sheet P are all performed in front of the multi-function printer 1 according to the this example. Moreover, the setting and taking of documents, the taking of the sheets P subjected to the image forming process, and the detaching and attaching of the developer cartridges 6 are all performed on the same side, that is, on the right side of the apparatus.

Accordingly, since these operations are similar with each other and can be easily operated from the front of the multi-function printer 1, the operability can be improved.

In the multi-function printer 1 according to this example, the apparatus can be miniaturized even when plural developing cartridges are provided, as well as the improvement in operability described above. That is because the developing cartridges 5 are disposed on one side in the axial direction of the developing roller 22.

Next, second to sixth examples in which the configuration of the multi-function printer 1 is partially modified will be described. Hereinafter, a configuration which is different from the first example will be described.

Second Example

Figure 6A:
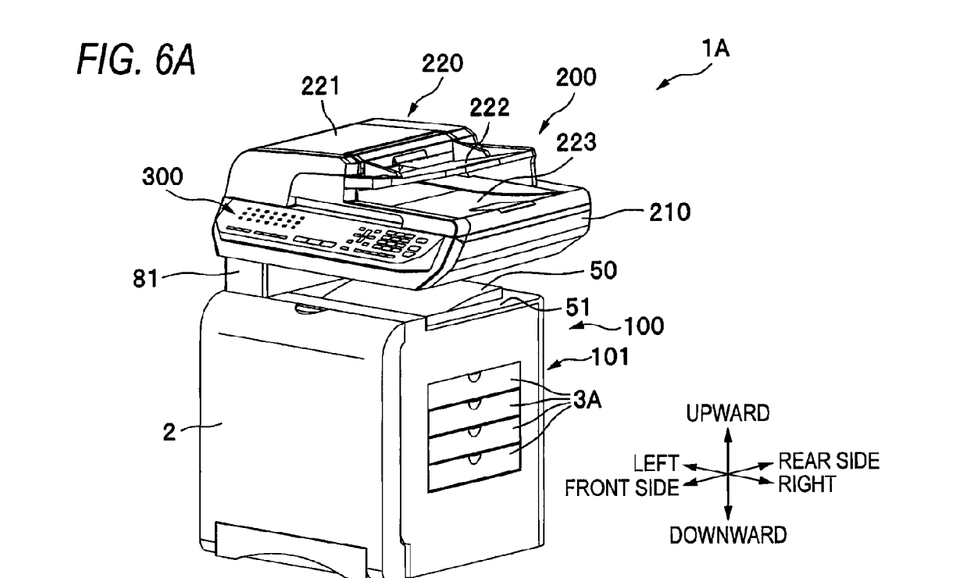
FIG. 6A shows a state where the side cover is closed.
Figure 6B:
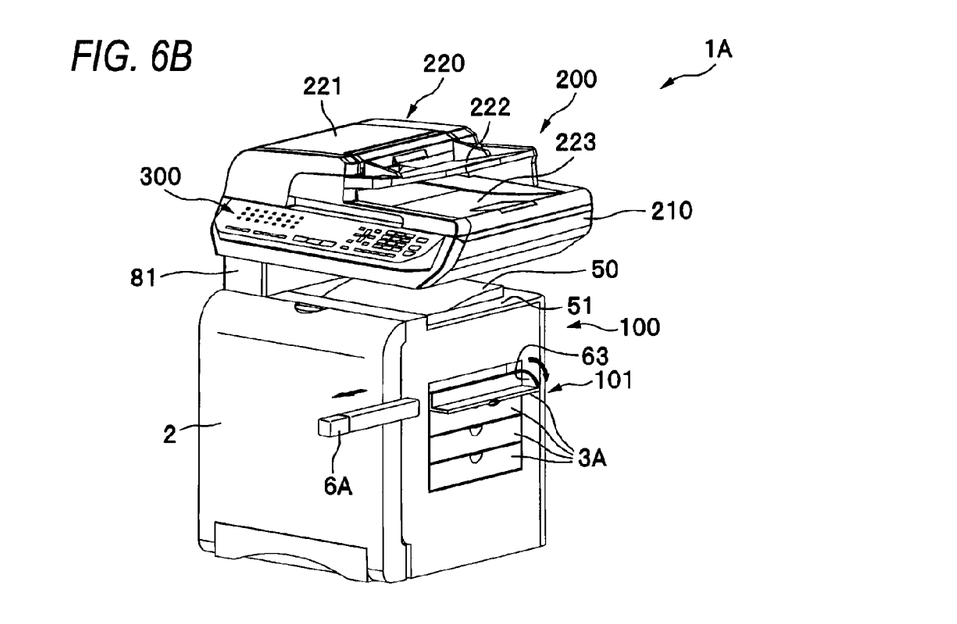
FIG. 6B shows a state where the side cover is opened.

FIGS. 6A and 6B are perspective views showing a multi-function printer 1A according to a second example. FIG. 6A shows a state where a side cover is closed, and FIG. 6B shows a state where the side cover is opened.

As shown in FIG. 6A, four side covers 3A, which are an example of a support member, are provided with a multi-function printer 1A according to the second example in correspondence to respective color developer cartridges 6A, differently from the side cover 3 according to the first example. The side covers 3A are configured to have a long door shape in the front and rear directions in correspondence to the shape of the developer cartridges 6A. As shown in FIG. 6B, the side covers 3A are each configured so as to be pivotable on one lower side. A guide 63 for preventing the developer cartridge 6A from being detached is provided with each of the side covers 3A on the rear side of the apparatus, but the guide 63 is opened on the front side.

When the developer cartridges 6A are exchanged in the multi-function printer 1A, the side covers 3A on the right side of the body casing 101 are pivoted downward to be opened, and the developer cartridges 6A can be detached by extracting the developer cartridges 6A from the front side. In addition, when the developer cartridges 6A are mounted, the side covers 3A are opened, the developer cartridges 6A are moved from the front side toward the side covers 3A to be loaded on the side covers 3A, and the side covers 3A are closed.

In this way, it is possible to easily detach or mount the developer cartridges 6A on the front side of the apparatus even in this embodiment in which the shape of the side covers are modified.

Third Example

Figure 7A:
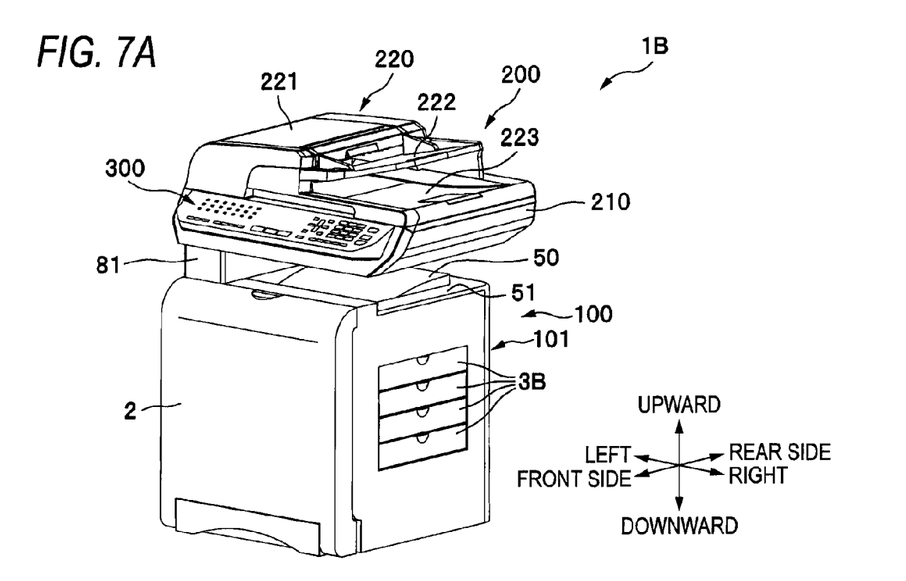
FIG. 7A shows a state where the side cover is in a closed state.
Figure 7B:
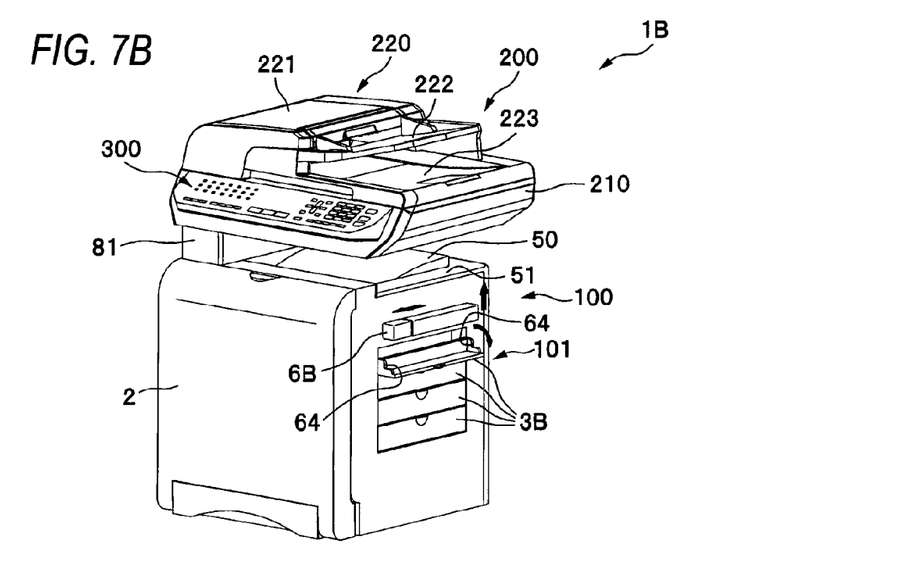
FIG. 7B shows a state where the side cover is in an opened state.

FIGS. 7A and 7B are perspective views showing a multi-function printer 1B according to a third example. FIG. 7A shows a state where a side cover is closed, and FIG. 7B shows a state where the side cover is opened.

As shown in FIG. 7A, a multi-function printer 1B according to the third example includes side covers 3B, which are configured by modifying a part of the side cover 3A according to the second example. As shown in FIG. 7B, in the side cover 3B, not only a guide 64 for preventing the developer cartridge 6B from being detached is provided on the rear side, but also the guide 64 is provided on the front side.

Accordingly, when the developer cartridges 6B are exchanged in the multi-function printer 1B, the side covers 3B on the right side of the body casing 101 are pivoted downward to be opened, and the developer cartridges 6B can be detached by lifting the developer cartridges 6B upward once and extracting the developer cartridges 6B from the front side. In addition, when the developer cartridges 6B are mounted, the side covers 3B are opened, the developer cartridges 6B are moved from the front side toward the upper side of the side covers 3B to move the developer cartridges 6B, the developer cartridges 6B are moved downward to be loaded on the side covers 3B, and the side covers 3B are closed.

In this way, it is possible to easily detach or mount the developer cartridges 6B on the front side of the apparatus even in this embodiment in which the shape of the side covers are modified.

Fourth Example

Figure 8A:
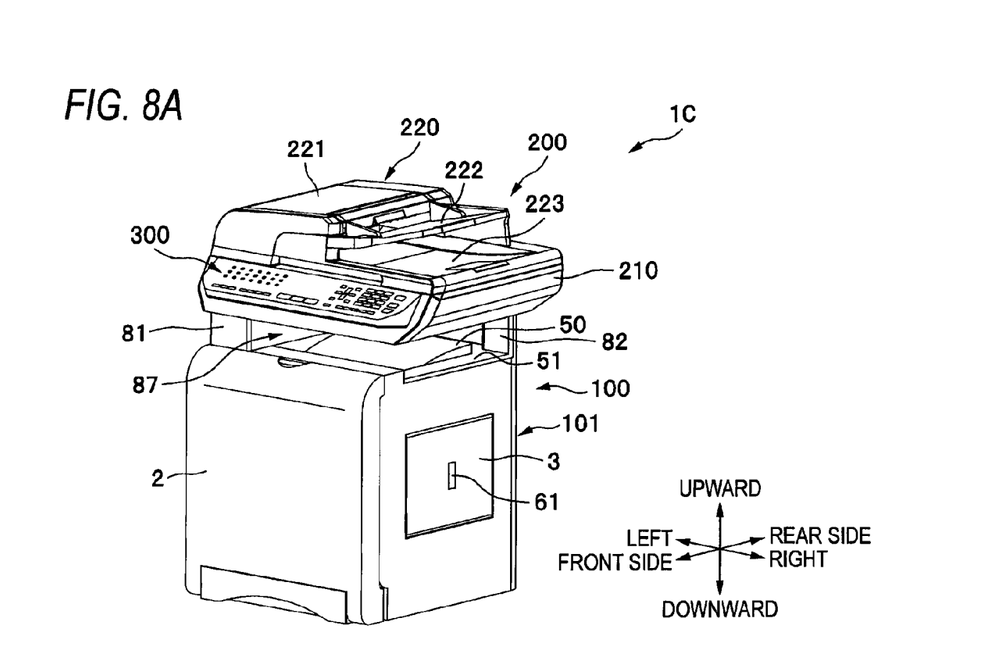
FIG. 8A is a perspective view of a multi-function printer according to a fourth example.
Figure 8B:
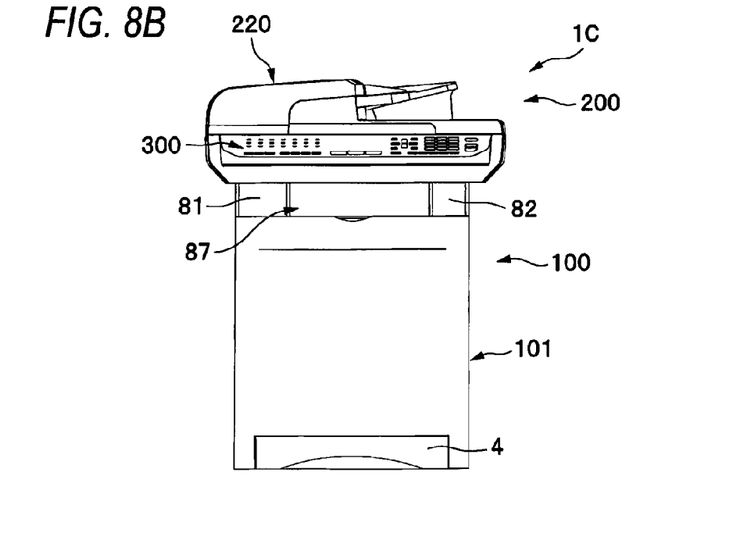
FIG. 8B is a front view of the multi-function printer according to the fourth example.

FIG. 8A is a perspective view of a multi-function printer 1C according to a fourth example, and FIG. 8B is a front view of the multi-function printer 1C according to the fourth example.

As shown in FIG. 8A, in a multi-function printer 1C according to this embodiment, a method of supporting the scanner unit 200 is different from that according to the first example. The scanner unit 200 is supported to the image forming unit 100 through the left support member 81, which is a first support member, and a rear support member 82 as a second supporting member having a column shape which is disposed in the right end portion of the image forming unit on the rear side. Moreover, a space between the image forming unit 100 and the scanner unit 200 are opened on three sides, that is, the right side, the front side, and the rear side (see an opening 87 shown in FIG. 8B).

With such a configuration, the scanner unit 200 of the multi-function printer 1C is more strongly supported to the image forming unit 100, compared to the multi-function printer 1 according to the first example. Even though the support configuration is modified in this manner, the space between the image forming unit 100 and the scanner unit 200 is opened on the right side and the front side. Accordingly, a user can easily take out the sheets P discharged in the discharge tray 50 on the right side or the front side.

Fifth Example

Figure 9A:
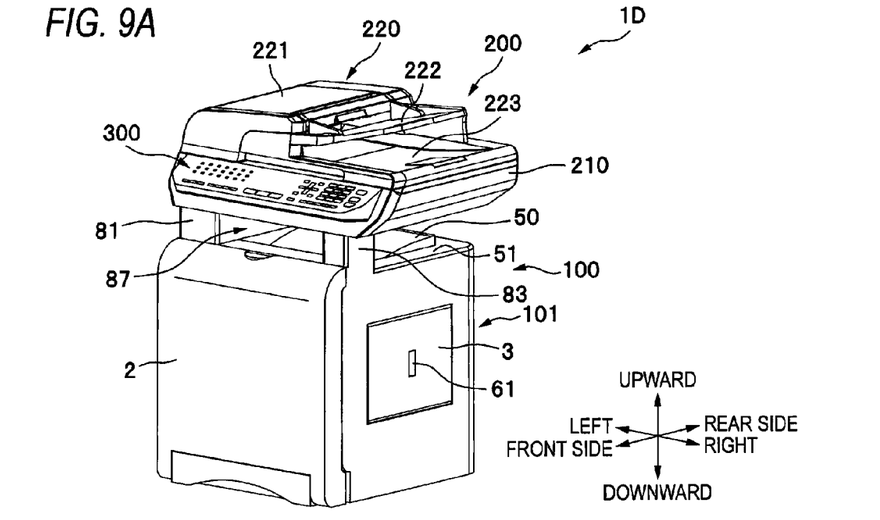
FIG. 9A is a perspective view of a multi-function printer according to a fifth example.
Figure 9B:
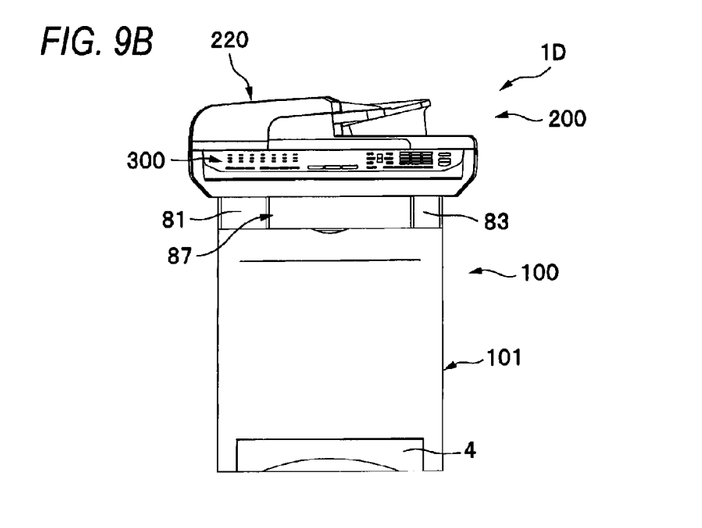
FIG. 9B is a front view of the multi-function printer according to the fifth example.

FIG. 9A is a perspective view of a multi-function printer 1D according to a fifth example, and FIG. 9B is a front view of the multi-function printer 1C according to the fifth example.

As shown in FIG. 9A, in a multi-function printer 1D according to this embodiment, a method of supporting the scanner unit 200 is different from that according to the first example. The scanner unit 200 is supported to the image forming unit 100 through the left support member 81, which is a first support member, and a front support member 83 as a third supporting member having a column shape which is disposed in the right end portion on the front side. An opening 87 is formed between the left support member 81 and the front support member 83, since the front support member 83 has the column shape. The discharge tray 50 can be seen from the front side through the opening 87. Moreover, a space between the image forming unit 100 and the scanner unit 200 is opened on three sides, that is, the right side, the front side, and the rear side.

With such a configuration, the scanner unit 200 of the multi-function printer 1D is more strongly supported to the image forming unit 100, compared to the multi-function printer 1 according to the first example. Even though the support configuration is modified in this manner, the space between the image forming unit 100 and the scanner unit 200 is opened on the right side and the front side. Accordingly, a user can easily take out the sheets P discharged in the discharge tray 50 from the right side or the front side.

Sixth Example

Figure 10A:
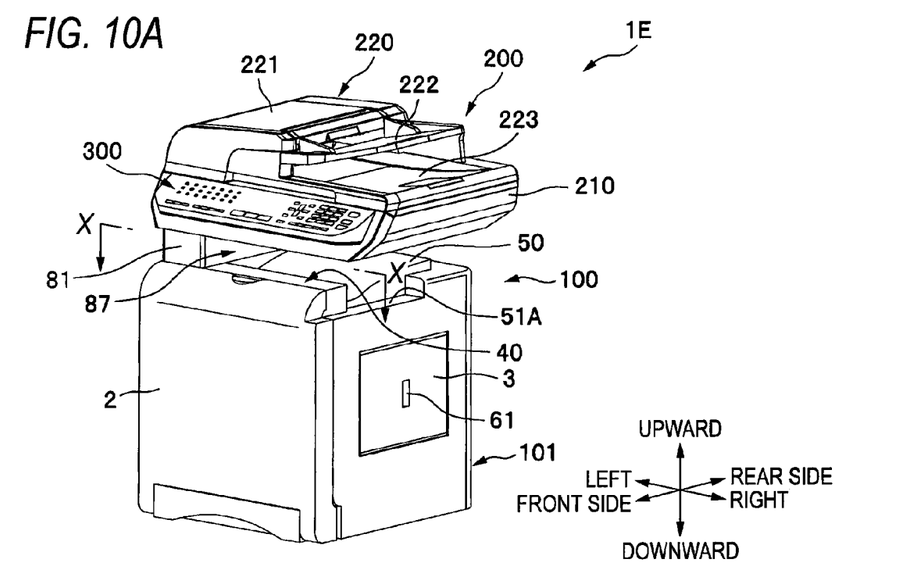
FIG. 10A is a perspective view of a multi-function printer according to a sixth example.
Figure 10B:
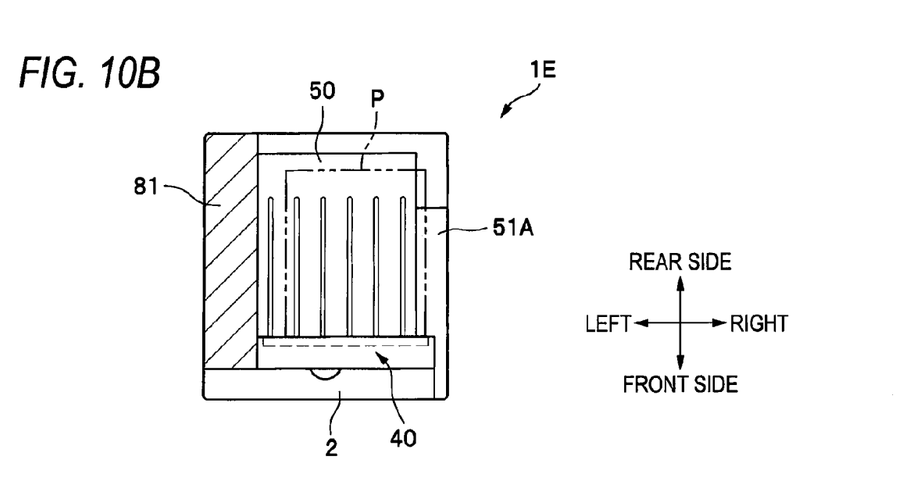
FIG. 10B is a sectional view taken along the line X-X shown in FIG. 10A.

FIG. 10A is a perspective view of a multi-function printer 1E according to a sixth example, and FIG. 10B is a sectional view taken along the line X-X shown in FIG. 10A.

As shown in FIG. 10A, a multi-function printer 1E according to this embodiment includes a different-shaped stepped portion on the right side of the discharge tray 50. A stepped portion 51A is formed lower than the entire surface of the discharge tray 50. Moreover, the stepped portion 51A extends not only to the right side of the discharge tray 50 but also the front side of the body casing 101. In other words, a part of the front side of the body casing 101 joining to the right side is opened. As shown in FIG. 10B, the stepped portion 51A extends more than the right end portion of the discharged sheet P in the left direction and is formed up to the portion below the sheets P stacked in the discharge tray 50.

With such a configuration, while the multi-function printer 1E performs the image forming process of the sheets P, the sheets P subjected to the image forming process are discharged so that the right end portion of the respective sheets P is stacked above the stepped portion 51A, as shown in FIG. 10B. Accordingly, a user can take out the sheets P in front of the multi-function printer 1E by stretching the hand on the right side and seizing the right end portions of the sheets P. By modifying the shape of the stepped portion 51A in this manner, a user can more easily take out the sheets P discharged in the discharge tray 50 from the right side.

As described above, the embodiments of the invention have been described. However, the invention is not limited to the above-described embodiments, but may be modified appropriately as follows.

In the above-described exemplary embodiments, the case where the operations such as the detaching and attaching of the developer cartridges are performed on the right side of the multi-function printer has been described. Alternatively, the operations may be performed on the left side.

In the above-described exemplary embodiments, the image forming apparatus which mounts four developing cartridges to perform the forming of color images has been exemplified. Alternatively, the invention can be also applied to an image forming apparatus which mounts only one developing cartridge to form images in monochrome.

In the above-described exemplary embodiments, the case where the space between the image forming unit 100 and the scanner unit 200 is opened on the front side and the rear side has been described. Alternatively, the space may be closed on one side or both the front and rear sides.

In the above-described exemplary embodiments, the case where the support unit is provided in the side cover has been described. Alternatively, the support unit may be provided so as to be slid in the right and left directions of the body casing 101.

The invention claimed is:

1. A multi-function printer comprising:
 an image forming unit, comprising:
  a body casing including a front, a rear opposite to the front in a first direction, a top, a bottom opposite to the top in a second direction, a first side and a second side opposite to the first side in a third direction perpendicular to the first direction and the second direction;
  a developing unit comprising a developing roller, having an axis extending in the third direction;

a side cover disposed on the first side of the body casing and configured to be opened and closed;

a developer cartridge configured to be detachably attached into the body casing from the first side of the body casing when the side cover is opened;

a discharge tray disposed on a top portion of the image forming unit;

a support unit configured to support the developer cartridge in the body casing;

a sheet feeding unit configured to be detachably attached into the body casing from the front of the body casing; and a discharge unit configured to discharge a sheet having an image formed thereon toward the rear of the body casing and onto the discharge tray; and a scanner unit provided above the image forming unit; and a support member connecting the image forming unit and the scanner unit, wherein the top of the body casing includes a first portion including an edge of the top of the body casing on the first side extending from the rear of the body casing toward the front of the body casing and a second portion closer to the second side than the first side and spaced apart from the first portion in the third direction, wherein the scanner unit includes a third portion and a fourth portion spaced apart from the third portion in the third direction, the third portion being spaced apart from the first portion of the body casing in the second direction such that the scanner unit is separated from the top of the body casing on the first side, wherein the support member extends between the second portion of the body casing and the fourth portion of the scanner unit in the second direction, wherein the support member extends from the rear of the body casing toward the front of the body casing in the first direction.

2. The multi-function printer according to claim 1, wherein a rear of the scanner unit protrudes outward beyond the rear of the body casing in the first direction.

3. The multi-function printer according to claim 1, further comprising:

a mounting unit provided in the body casing and configured to receive the developing unit attached into the body casing from the front of the body casing; and a front cover configured to be opened to expose the mounting unit, wherein the support member extends from the rear of the body casing to a rear end of the front cover.

4. The multi-function printer according to claim 3, wherein the image forming unit further comprises a conveying belt configured to convey the sheet and be provided in the front cover.

5. The multi-function printer according to claim 1, wherein the developing unit comprises a plurality of the developing units configured to be arranged in the second direction.

6. The multi-function printer according to claim 1, wherein the image forming unit further comprises a stepped portion that is formed lower than at least a part of the discharge tray and is formed on the first portion.

7. The multi-function printer according to claim 1, wherein the third portion of the scanner unit protrudes outward beyond the side cover in the third direction when the side cover is closed.

8. The multi-function printer according to claim 1, wherein the support unit is configured to move outward at least partially beyond the body casing in the third direction so as to detachably attach the developer cartridge into the body casing.

9. The multi-function printer according to claim 1, wherein the support unit is provided in the side cover.

10. The multi-function printer according to claim 1, wherein the scanner unit comprises an automatic document feeder configured to scan a document and discharge the scanned document toward the third portion of the scanner unit.

11. The multi-function printer according to claim 1, wherein the discharge tray comprises:

a first discharge guide adjacent to the discharge unit;

a second discharge guide provided adjacent to the second portion of the top of the body casing; and a stacking portion configured to stack each sheet discharged by the discharge unit, wherein the first and second discharge guides are formed higher than at least a portion of the stacking portion.

12. The multi-function printer according to claim 1, wherein the developer cartridge is configured to be overlapped by the developing unit in a third direction when the developer cartridge is attached into the body casing.

13. The multi-function printer according to claim 1, wherein the developer cartridge is configured to extend in the first direction.

14. The multi-function printer according to claim 1, wherein the developer cartridge comprises a plurality of developer cartridges.

15. The multi-function printer according to claim 1, wherein the scanner unit comprises an automatic document feeder having a reading section, and wherein the support member overlaps the reading section in the second direction.

16. The multi-function printer according to claim 1, wherein the discharge tray includes a first edge at the first portion and a second edge opposite to the first edge in the third direction, and wherein the support member does not project beyond the second edge of the discharge tray toward the first side of the body casing in the third direction.

* * * * *